United States Patent
Müller

(10) Patent No.: US 12,346,768 B2
(45) Date of Patent: Jul. 1, 2025

(54) METHOD OF READING AN OPTICAL CODE AND OPTOELECTRONIC CODE READER

(71) Applicant: SICK AG, Waldkirch (DE)

(72) Inventor: Romain Müller, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/432,635

(22) Filed: Feb. 5, 2024

(65) Prior Publication Data
US 2024/0265219 A1    Aug. 8, 2024

(30) Foreign Application Priority Data
Feb. 6, 2023 (EP) .................... 23155136

(51) Int. Cl.
*G06K 7/10* (2006.01)
*G06K 7/14* (2006.01)

(52) U.S. Cl.
CPC ................... *G06K 7/1413* (2013.01)

(58) Field of Classification Search
CPC ............... G06K 7/1413; G06K 7/1417; G06K 19/06037; G06K 7/10732; G06K 7/1447; G06K 2207/1018
USPC .......................... 235/462.01, 454
See application file for complete search history.

(56) References Cited

U.S. PATENT DOCUMENTS 10,650,211 B2    5/2020    Olivastri
2003/0116628 A1    6/2003    Nakazawa et al.
2007/0172145 A1*    7/2007    Altunbasak .............. H04N 5/20 348/E5.073
2013/0342733 A1*    12/2013    Burghardt ............ G06K 7/1417 348/234

FOREIGN PATENT DOCUMENTS

| DE | 10137093 A1 | | 2/2003 | |
| DE | 102018109392 A1 | | 10/2019 | |
| EP | 0366099 B1 | | 1/1996 | |
| EP | 0996079 | * | 4/2000 | ........... G06K 7/1443 |
| EP | 1359746 A1 | | 11/2003 | |
| EP | 1365577 A1 | | 11/2003 | |
| EP | 2003599 A1 | | 12/2008 | |
| EP | 2555160 A1 | | 2/2013 | |
| EP | 2677458 A1 | | 12/2013 | |

(Continued)

OTHER PUBLICATIONS

Hansen, et al. "Real-Time Barcode Detection and Classification using Deep Learning"; SCITEPRESS; 2017.

(Continued)

*Primary Examiner* — Daniel St Cyr
(74) *Attorney, Agent, or Firm* — Nath, Goldberg & Meyer; Jerald L. Meyer

(57) ABSTRACT

A method of reading an optical code is provided in which an image having the code is recorded, a first brightness adaptation of the image is carried out, a region of interest having the optical code is localized in the image, and the optical code in the region of interest is read. In this respect, the first brightness adaptation is a local brightness adaptation that is carried out in partial regions of the image still while further sections of the image are read; and the localization of the region of interest is based on image information of the image already processed by the first brightness adaptation.

18 Claims, 4 Drawing Sheets

(56) References Cited

FOREIGN PATENT DOCUMENTS

| | | |
|---|---|---|
| EP | 2677492 A1 | 12/2013 |
| EP | 3428834 A1 | 1/2019 |
| EP | 3495987 B1 | 8/2021 |
| EP | 3916633 A1 | 12/2021 |
| EP | 4080402 A1 | 10/2022 |
| EP | 4231195 A1 | 8/2023 |
| EP | 4277259 A1 | 11/2023 |

OTHER PUBLICATIONS

Zhao, et al. "Deep Dual Pyramid Network for Barcode Segmentation using Barcode-30k Database"; Jul. 2018.

Zhuang, et al. "Image Enhancement via Subimage Histogram Equalization Based on Mean and Variance"; Computational Intelligence and Neuroscience: 2017.

Xiao, et al. "1D Barcode Detection via Integrated Deep-Learning and Geometric Approach"; Applied Sciences; 2019.

Zharkov, et al. "Universal Barcode Detector via Semantic Segmentation"; Jun. 2019.

* cited by examiner

METHOD OF READING AN OPTICAL CODE AND OPTOELECTRONIC CODE READER

FIELD

The invention relates to a method of reading an optical code and to an optoelectronic code.

BACKGROUND

Code readers are known from supermarket checkouts, for automatic parcel identification, for sorting mail shipments, from baggage handling at airports, and from other logistics applications. In a code scanner, a reading beam is guided transversely over the code by means of a rotating mirror or by means of a polygon mirror wheel. A camera based code reader records images of the objects having the codes located thereon by means of an image sensor and image evaluation software extracts the code information from these images. Camera based code readers also cope without problem with different code types than one-dimensional barcodes which also have a two-dimensional structure as a matrix code and provide more information.

In an important application group, the code bearing objects are conveyed past the code reader. A code scanner here detects the respective codes successively led into its reading zone. Alternatively, in a camera based code reader, a line scan camera reads the object images having the code information successively and linewise with the relative movement. As a rule, image data are recorded using a two-dimensional image sensor that overlap more or less depending on the recording frequency and on the conveying speed. So that the objects can be arranged in any desired orientation on the conveyor, a plurality of code readers are often provided at a reading tunnel to record objects from a plurality of sides or from all sides.

The images to be processed are becoming larger and larger thanks to the continuing development in camera and image sensor technology. The huge amounts of data present the limited processing capacities and bandwidths for forwarding to and processing in a camera under real time conditions with challenges. In this respect, the use of heterogeneous processing architectures, i.e. a combination of a microprocessor (central processing unit, CPU) having, for example, an FPGA (field programmable gate array), a DSP (digital signal processor), a GPU (graphics processing unit), or a so-called AI accelerator (neural processing unit, NPU, tensor processing unit TPU).

The combination with an FPGA that is responsible for the reading of the image data from the image sensor has particularly proven itself here. The FPGA is additionally connected to a memory of the microprocessor via a high speed interface (peripheral component interconnect, PCI, PCI express, PCIE, mobile industry processor interface, MIPI). The image data are thus transmitted into the memory by the FPGA via DMA (direct memory access). This process of reading and saving is called streaming. The decoder implemented by means of CPU can then access the stored images and read the codes downstream. The streaming approach is not easily possible using other above-named additional modules of a heterogeneous architecture that as a rule themselves already require a stored image while the FPGA can read and further process image data directly pixel-wise.

The image data are preferably already pre-processed directly on the fly in the FPGA and in this respect additional information or metadata for the microprocessor can be saved with the image data. Typical pre-processing steps relate to the segmentation in which regions of interest (ROIs) having code candidates are located or to a brightness adaptation. These two possible pre-processing steps will be looked at in more detail in the following. EP 2 003 599 A1 describes an optoelectronic sensor and a method for the detection of codes in which a binarizer is already configured for a conversion of a color image or a gray scale image into a binary image during the reception and/or in real time in that a respective read section is binarized even while the further sections are read. EP 1 365 577 A1 discloses a method of operating an optoelectronic sensor in which an image is already compressed during the reception. The capability of the FPGA is respectively used in such pre-processing steps to carry out a number of simple processing operations such as matrix multiplications in parallel in real time. Sequential, more complex processing operations such as those of a decoder for reading optical codes are reserved for the microprocessor that makes use of the provided image data and possible pre-processing results for this purpose.

Code image zones, that is those zones in the image that may potentially contain a code, are sought in a recorded starting image of a code bearing object during segmentation or pre-segmentation as preparation for the reading of codes. In most of today's code reading applications, the segmentation takes place by traditional image processing algorithms and by manually prepared classifiers. A different approach for the segmentation is based on artificial neural networks, in particular deep neural networks, convolutional neural networks (CNNs).

In the paper "Deep Dual Pyramid Network for Barcode Segmentation using Barcode-30k Database", arXiv preprint arXiv: 1807.11886 (2018), a large data record is synthesized and thus a code segmentation by CNNs is carried out. The exact network architecture and hardware implementation are not presented.

Xiao, Yunzhe, and Zhong Ming, "1D Barcode Detection via Integrated Deep-Learning and Geometric Approach", Applied Sciences 9.16 (2019): 3268 claim a performance in the localization of barcodes improved by at least 5% with respect to previous approaches without parameters having to be set manually.

Hansen, Daniel Kold, et al, "Real-Time Barcode Detection and Classification using Deep Learning", IJCCI. 2017 recognize code regions including a rotation in real time using an Intel i5-6600 3.30 GHz and a Nvidia Geforce GTX 1080.

Zharkov, Andrey; Zagaynov, Ivan, Universal Barcode Detector via Semantic Segmentation, arXiv preprint arXiv: 1906.06281, 2019 recognize barcodes and identify the code type in a CPU environment.

DE 101 37 093 A1 discloses a method of recognizing a code and a code reader in which the step of localizing the code within an image environment is carried out by means of a neural network. The training and architecture of the neural network are not described in detail. DE 10 2018 109 392 A1 proposes the use of convolutional neural networks for detecting optical codes. A further code reader is known from U.S. Pat. No. 10,650,211 B2 that uses convolutional neural networks for the localizing of the codes in a recorded image.

EP 3 428 834 B1 uses a classical decoder that works with processes without machine learning to train a classifier configured for machine learning or more specifically a neural network. This document does not, however, deal with the pre-processing or the localizing of code regions.

EP 2 555 160 B1 locates regions of interest or code candidates using a contrast measure in a pre-processing on an FPGA.

A camera and a method for processing image data are described in EP 3 916 633 A1 in which method a segmentation takes place by means of a neural network in a streaming process, i.e. image data are already processed while further image data are still being read. At least the first layers of the neural network can be implemented on an FPGA. This substantially reduces the processing times and the demands on the hardware. In some embodiments, the original image is streamed to a memory in addition to the results of the neural network in accordance with possible classical pre-processing steps.

The still unpublished European patent application bearing the file reference 22 157 758.8 deals with a localizing of code image regions that combines a first segmentation process using classical image processing and a second segmentation process using machine learning with one another to thus arrive at considerably more reliable results.

The code reading is simplified with a brightness adaptation or a contrast spread as a further conceivable pre-processing step when the brightness range or gray scale range is not utilized in the image recording. Possible reasons for this are an underexposure, a dark background, or, in the case of codes, also a poor print. In contrast spreading, the recorded brightness values are rescaled or spread over the available dynamic range or gray scale range of, for example, eight bits. A contrast spread can, for example, take place after the image recording depending on the distance from the object. However, the objects and associated distances have to be known for this purpose. In EP 2 677 458 A1 a respective correction factor for individual pixels or groups of pixels are calculated from a perspective transformation for a brightness correction that converts geometries on an object level in the detection zone into geometries of the image plane.

EP 0 366 099 B1 discloses a processing-efficient technique for an image contrast improvement. In this process, a histogram is formed from the brightness values of the pixels and a transfer function is formed from it with which the original brightness values are then adapted. EP 1 359 746 A1 deals with an image processing device that likewise builds up a histogram to localize the smallest and largest brightness values and to spread the image signal on this basis. Only a global contrast spread is respectively thereby achieved. EP 3 495 987 B1 describes a method of reading barcodes in which the contrast is locally adapted from histograms of a neighborhood. It is in turn necessary for this purpose to generate local histograms for the respective pixel to be corrected over and over again with a great effort.

The paper by Zhuang, Liyun, und Yepeng Guan, "Image enhancement via subimage histogram equalization based on mean and variance", Computational intelligence and neuroscience 2017 (2017), describes a method in which a histogram of a starting image is divided into four parts. This division relates to a histogram, not to the starting image, and thus does not make any local contrast spreading possible.

The still unpublished European patent application bearing the file references 22 173 324.9 describes a camera device and a method for the recording and brightness adaptation of an image. In this process, the image is divided into tiles in a pre-processing step and a respective brightness distribution is determined for the tiles. Regions of interest are additionally identified. After the association of tiles with a region of interest, the respective brightness distributions of this selection of tiles are combined to form a brightness distribution of the region of interest. The region of interest thus undergoes contrast spreading in an efficient and targeted manner.

If both segmentation and contrast spreading are to be carried out, a practical problem results. A targeted contrast spread of a region of interest is only possible with knowledge of the region of interest. However, with an image that is too dark or too bright, the segmentation may possibly not take effect on the region of interest at all. Conversely, a global contrast spread or also a local contrast spread can also be carried out independently of a result of a segmentation. This in turn has effects on the segmentation and on the code reading. The segmentation in the image that is contrast-spread in a sweeping manner and without consideration of regions of interest possibly behaves in an unexpected manner and it is easily possible that a code is thus no longer readable. For example, a bright code is oversaturated in a dark image or a dark image in a bright image also remains too dark after the contrast spreading. In an on-the-fly processing, the time behavior must also be considered since the image information is always only partially available, related to the past so-to-say

SUMMARY

It is therefore the object of the invention to further improve the reading of an optical code.

This object is satisfied by a method of reading an optical code and by an optoelectronic code reader in accordance with the respective independent claim. It is a computer implemented method that runs, for example, in a code reader or in a processing unit connected thereto. An image having the optical code is recorded preferably section-wise or row-wise, and a first brightness adaptation of the image is carried out. In addition, a region of interest having the optical code is localized in the image. There can be a plurality of optical codes and a plurality of regions of interest; the processing of one region of interest that can be transferred to further regions of interest will be described as representative. The image content of the region of interest is supplied to a decoder that attempts to read the content of the optical code using at least one method known per se and therefore not explained in any more detail here.

The invention starts from the basic idea of carrying out the first brightness adaptation at a very early point in the processing chain so that the search for the region of interest can already make use of correspondingly prepared image information. The first brightness adaptation is local for this purpose, that is it is fed from a respective local environment within the image and not from the whole image. This makes on-the-fly processing possible during the streaming of the image. The image data of the image are therefore read by an image sensor, for example, one after the other and are preferably recorded one after the other in the course of a relative movement between the code bearing object and the recording unit. The first brightness adaptation already takes place in partial regions of the image while further sections of the image are read. The region of interest is then localized in the image data pre-processed by the first brightness adaptation. This can likewise be locally assessed; typical criteria include sufficient contrast or a number of edges; reference is made to the prior art named in the introduction for further details. The localization of the region of interest can therefore likewise already take place on the fly during streaming, following the first brightness adaptation n in the processing chain. It is alternatively conceivable to stream the respective partial regions processed by the first brightness adaptation as a pre-processed image to a memory and only to look for the region of interest in this pre-processed image in a downstream step.

The two terms partial region and section have deliberately been selected as distinct because the granularity of the local brightness adaptation and of the respective data packets preferably differs during the streaming. Respective rows are in particular read while the brightness adaptation takes place over blocks having parts of a plurality of consecutive rows. Both the partial regions and the sections are preferably an a priori division that is independent of the image content.

The invention has the advantage that a segmentation and brightness adaptation can be optimally combined with one another by a skilled sequence of the processing steps. This in particular makes possible an intelligent contrast spreading that is adapted to the region of interest. There was conventionally a circular conflict here: it is necessary to know the region of interest for an intelligent contrast spread. However, a contrast spread must occasionally have previously taken place to locate the region of interest. The invention resolves this circle in a computing-efficient manner. Codes can thereby now also be read under difficult conditions, for instance in particularly bright or dark images.

The first brightness adaptation is preferably a contrast spread that spreads a range of the brightness values occurring in a respective partial region over a larger range. The actually occurring brightness values are rescaled to a larger range or to a larger portion of the possible brightness values. A spread can take place over the total available dynamic range or a marginal region can be omitted. A spread can take place, for example in an 8 bit gray scale resolution, to values from 0 . . . 255 or only from i . . . (255−j), where i, j are small natural numbers, for instance i=j=15. The rescaling is preferably linear. In the case of color images, the colors can be individually treated or a gray scale can be calculated for a plurality of colors and the adapted value can be converted back to the colors involved.

The range of the brightness values occurring in a partial region is preferably determined from at least one smallest and one largest occurring brightness value. This is a very simple possibility, that can be performed with a particularly small processing effort, of determining the actually occurring brightness values. A smallest occurring brightness value MinGray and a largest occurring brightness value MaxGray results and the interval [MinGray, MaxGray] can then be spread over a larger interval such as [1, 255−j]. It is conceivable to ignore particularly dark or bright brightness values or individual overshoots so that they cannot be considered for MinGray or MaxGray. A plurality of smallest and largest occurring brightness values can in particular be determined and a mean value or median can be determined therefrom.

The range of the brightness values occurring in a partial region is preferably determined from two peaks in a local histogram of the brightness values over the partial region. Such a histogram is a discrete brightness distribution and includes other representations of a brightness distribution such as a function fit to acquire a continuous brightness distribution. The histogram is ideally bimodal with an optical code. However, if there are more than two peaks due to various conceivable disruptions, the first and last peaks or the two most pronounced peaks can be used or, if there is only one peak, the merger can be separated into two peaks. It is moreover conceivable to discard a particularly bright peak, for instance with an 8 bit gray scale resolution in a range above a value of 240, 245, 250, or 252, since it is presumably an uninteresting shine reflection, in particular when there is an additional, somewhat less bright peak and a dark peak. The range does not have to directly result from the location of the peak, but can rather still be constricted or even better expanded. The histogram can be smoothed, for example by a Gaussian filter, prior to the localizing of peaks. It is conceivable to include the procedure of the previous paragraph and to take the values MinGray, MaxGray into account in the fixing of the range, for example to place the limits of the range between MinGray and a dark peak or MaxGray and a bright peak, in particular in the respective middle.

The image is preferably read row-wise, with a plurality of rows being buffered to form partial regions therefrom. This is particularly suitable for an image recording in a relative movement, for example, of objects on a conveyor belt using a linear (image) sensor. An image of a matrix sensor can also be read row-wise. It is conceivable to alternatively speak of a column-wise reading; this is not further distinguished. A row-wise streaming results with pre-processing on the fly and a transfer to a memory or to a downstream processing. In this respect, some preceding rows are buffered in addition to the current row so that a certain history remains available for the on-the-fly processing during the streaming.

The partial region is preferably a block of a plurality of partial sections of a plurality of consecutive rows. The just addressed buffering is thus used to be able to relate the first brightness adaptation to some preceding rows and not only to the current row. A partial section comprises 128 pixels of a row, for example, and a 5×128 pixel block of five consecutive rows is formed. The numerical values are thus particularly suitable, but nevertheless initially just an example.

Brightness values of at least one adjacent block are preferably included in the first brightness adaptation of a block. The inclusion in particular takes place by interpolation; a pixel value after a first brightness adaptation is then determined from its own block and at least one adjacent block by a weighting of the blocks corresponding to an interpolation rule. It must again be pointed out that only an already read part of the information, that is so-to-say the past, is always available through the streaming. It is, however, possible to delay the first brightness adaptation a little, with a buffering of the read sections of the image to thus be able to look a little further into the future and specifically to be able to take adjacent blocks into account in all directions. The first brightness adaptation preferably only relates to the current block and its directly preceding adjacent block.

The region of interest is preferably located by machine learning in a segmentation process, with the segmentation process in particular having a neural network and specifically a deep convolutional neural network (CNN). After the first brightness adaptation, there may be artifacts in the image with which a segmentation process using machine learning can deal with better than a classical image processing. In this respect, classical image processing and machine learning should be understood as opposites. A classical image processing has already been prepared for its task by its programming and does not first require experience or training and its performance is more or less constant from the start up to and over its total running time. In machine learning, in contrast, all this by no means depends only on a programmed structure, but rather only results in conjunction with the training and the quality of the training data. Segmentation by means of a neural network is at least possible on the fly for the early layers, possibly all the layers, during the streaming; reference is additionally made to EP 3 916 633 A1 already named in the introduction for this purpose.

The neural network is preferably trained by means of supervised learning using example images that are in particular evaluated using the results of a segmentation and/or decoding process without processes of machine learning. The supervised learning makes it possible to generalize to starting images presented later in operation from a training dataset with examples of a specified correct evaluation. Corresponding architectures of neural networks and algorithms for training and operation (inference) are known per se so that well-functioning solutions can be made use of or can be placed thereon. Some citations were named in the introduction. The assignment of the correct evaluation to an example image, that is the annotation or labeling, can in principle take place by hand since the training takes place before the run time. At least one classical decoder can additionally or alternatively be used that evaluates example images and that only annotates code image zones retrospectively as a positive example when a code could actually be read there.

The image having the code is preferably stored as the original image without the first brightness adaptation. The respectively read sections are subjected in this embodiment, on the one hand, to a first brightness adaptation as described. At the same time, the original image data are written to a memory, for example, without a first brightness adaptation. A second streaming channel to loop through the original image thus in particular effectively results. Different pre-processing steps than the first brightness adaptation remain conceivable for the looped through original image, for example a binarization, that are applied to the original image. In another respect, those image data that are subjected to the first brightness adaptation can selectively additionally be stored or discarded as soon as the region of interest has been localized.

The code in a region of interest is preferably read with information of the image without the first brightness adaptation. Use is particularly preferably made for this purpose of the looped through original image in accordance with the preceding paragraph. The first brightness adaptation then only serves the localizing of regions of interest. The corresponding image data in the original image are determined with knowledge of the region of interest. After the first brightness adaptation, that has not taken any particular consideration of the regions of interest that are not yet known at all, codes can namely often no longer be easily read or read at all. With this embodiment, the first brightness adaptation is used to also reliably locate the regions of interest in particularly dark or bright images. Codes are then read in the regions of interest from original image data without any quality loss due to the first brightness adaptation.

A second brightness adaptation is preferably carried out for the region of interest prior to the reading of the code. The second brightness adaptation preferably takes place on original image data that were not changed by the first brightness adaptation. The second brightness adaptation generally works like the first brightness adaptation, but is now not related to previously fixed partial regions, but rather the region of interest. Artefacts due to the inclusion of image regions without a code are avoided. In this sense, it is an adapted or intelligent brightness adaptation and in particular contrast spread. If there are a plurality of regions of interest, the second brightness adaptation preferably takes place individually for each region of interest. A second brightness adaptation outside regions of interest preferably does not take place.

Pre-processing steps of the first brightness adaptation are preferably used for the second brightness adaptation, in particular smallest and largest brightness values occurring in the respective partial regions and/or local histograms of brightness values occurring in a respective partial region. The second brightness adaptation thereby becomes particularly computing-efficient. Evaluations of the brightness that can be used again are already carried out per partial region as part of the first brightness adaptation.

A selection of those partial regions that correspond to the region of interest is particularly preferably determined. In more illustrative terms, they are those partial regions or blocks that cover the region of interest. As rule, in this process, marginal effects occur because a margin of the second partial region is not covered or is at least not covered everywhere by a first partial region or, conversely, a first partial region projects over the margin of the second partial region. A coverage that is too generous and have too many tiles or a coverage that is sparse and has too few tiles is selectively conceivable here or also a mixed form that projects over a part of the margin and omits a different part of the margin. Partial regions that overlap the region of interest with a predetermined minimum portion are preferably included in the selection. The minimum number is preferably given as a percentage of the number of pixels in a partial region and thus as a surface ratio and is a parameter that can be selected in accordance with a generous or sparse coverage of the region of interest with partial regions.

If the second brightness adaptation is based on a largest or smallest occurring brightness value, only the respective largest and smallest occurring brightness values of the partial regions of the selection are to be compared. If a histogram of the brightness values is to be formed, the local histograms of the partial regions of the selection can be merged, i.e. the counts of the local histograms can be added bin-wise. In other representations of the brightness distribution without histograms, it is likewise possible with a few simple computing steps to generate a brightness distribution of the region of interest from the brightness distributions per partial region.

A first processing unit advantageously reads the image in the sections, carries out the first brightness adaptation of the image, and localizes the region of interest in the image. The first processing unit is thus responsible for the streaming and meanwhile for the first brightness adaptation and the segmentation on the fly during the streaming in each case. A large number of pixel accesses is required in these steps. The first processing unit preferably has an FPGA (field programmable gate array) for this purpose. An FPGA is particularly suitable for streaming image data and for a real time processing of large data quantities using a large number of comparatively simple individual computing operations.

A second processing unit, in particular a microprocessor, advantageously reads the optical code in the region of interest and in particular carries out a second brightness adaptation for the region of interest beforehand. As already mentioned, the first processing unit and in particular an FPGA are particularly suitable for streaming and for a real time processing of large data amounts with comparatively simple individual computing operations. A CPU, in contrast, is a lot more flexible and capable per se of more complex computing steps and this is of advantage for a more complex image processing such as the code reading. The second processing unit is also more suitable for the second brightness adaptation. It can make use of partial results of the first processing unit as part of the first brightness adaptation for this purpose, as previously described. The second processing unit preferably has access to a memory into which the original image without any first brightness processing is streamed.

The optoelectronic code reader in accordance with the invention comprises at least one light reception element for generating image data from received light and a control and evaluation unit in which a method of an reading optical code is implemented in one of the embodiments explained. The light receiver can be that of a barcode scanner, for example a photodiode, and the intensity profiles of the scans are assembled row-wise to form the output image. It is preferably an image sensor of a camera based code reader. The image sensor in turn can be a linear sensor for detecting an image row or a matrix sensor whose recordings are merged sectionally to form a larger starting image. A network of a plurality of code readers or camera heads is likewise conceivable.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
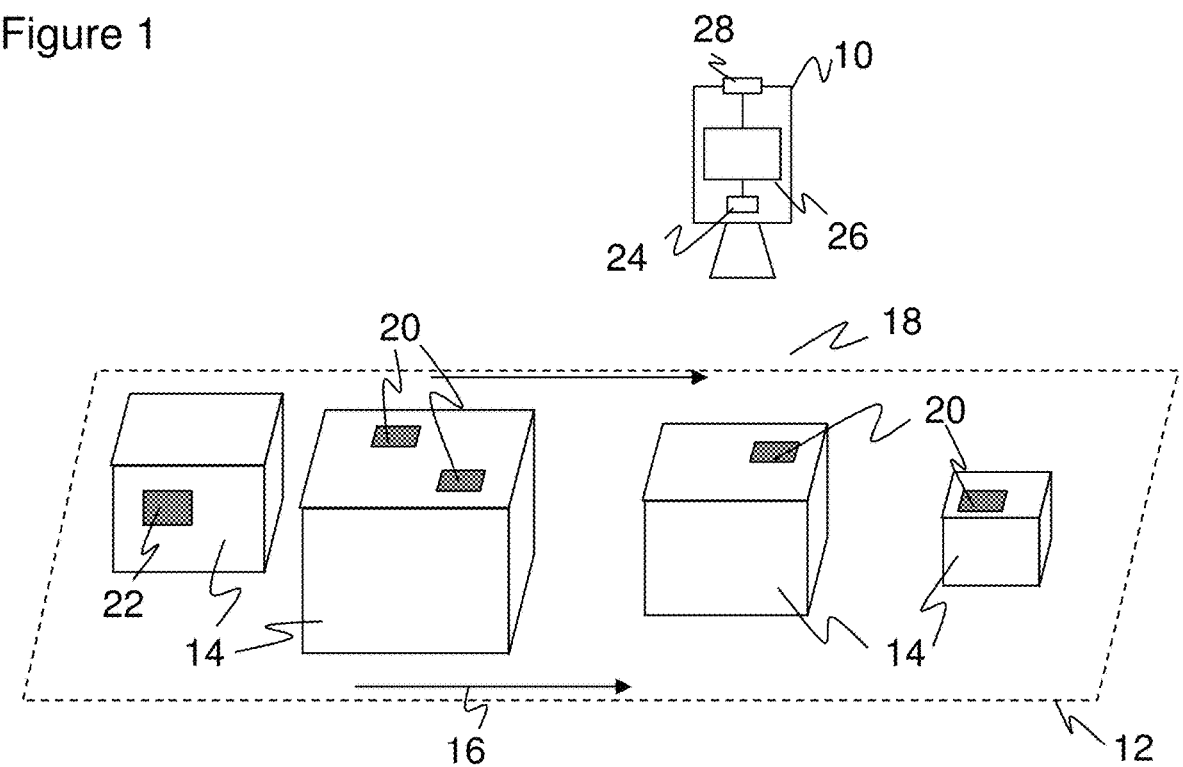
FIG. 1 a schematic overview representation of the exemplary installation of a code reader above a conveyor belt.

FIG. 1 shows a camera based code reader 10 which is mounted above a conveyor belt 12 which conveys objects 14 through the detection zone 18 of the code reader 10, as indicated by the arrow 16. The objects 14 bear codes 20 on their outer surfaces which are detected and evaluated by the code reader 10. The codes 20 can only be recognized by the code reader 10 when they are affixed to the upper side or at least in a manner visible from above. Differing from the representation in FIG. 1, a plurality of code readers 10 can be installed from different directions for the reading of a code 22 affixed, for instance, to the side or to the bottom in order to permit a so-called omnireading from all directions. This stationary use of the code reader at a conveyor belt 12 is very common in practice. The invention, however, relates to the code reading or to the code reader 10 itself so that this example may not be understood as restrictive.

The code reader 10 detects image data of the conveyed objects 14 and of the codes 20 by an image sensor 24 and said image data are further processed by a control and evaluation unit 26. The control and evaluation unit 26 will be described in more detail immediately with reference to FIG. 2. The code reader 10 outputs information such as image data, possibly with different processing stages or read codes, via an interface 28.

Figure 2:
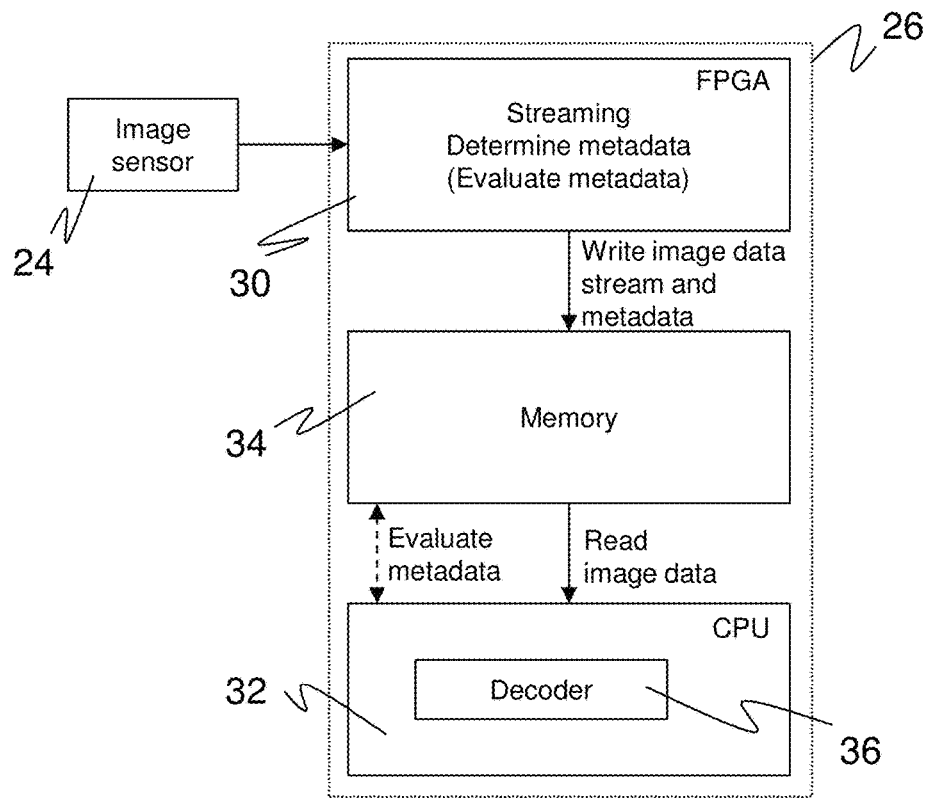
FIG. 2 a schematic representation of a heterogeneous architecture for image evaluation and brightness adaptation with an FPGA as a streamer and a CPU for further image processing or as a decoder.

FIG. 2 shows the control and evaluation unit 26 and its integration in a schematic representation. This representation shows an advantageous embodiment; a control and evaluation unit 26 of any desired internal structure can generally read the image data of the image sensor 24 and process them in the manner still to be described. The control and evaluation unit 26 in the preferred embodiment in accordance with FIG. 2 comprises a first processing unit 30 that will be explained in the following for the example of an FPGA (field programmable gate array) and a second processing unit 32 that will be explained in the following for the example of a CPU (central processing unit). The second processing unit 32 preferably has a decoder 36 for reading optical codes.

The first processing unit 30 is, on the one hand, connected to the light Image sensor 24 and, on the other hand, has an interface in the direction of the second processing unit 32, preferably a high speed interface (PCI, PCIE, MIPI). Both processing units 30, 32 can access a memory 34 for image data and additional information, metadata, or processing results. The corresponding reading and writing procedures preferably take place by means of DMA (direct memory access). The memory 34 can be understood at least functionally and, depending on the embodiment, also structurally as part of the second processing unit 32.

In operation, the image sensor 24 now respectively records a new image or a new image section, in particular an image row, with the image rows then being successively stitched together in the course of the relative movement between the code reader 10 and the object 14. The image data of the light sensor 24 are read by the first processing unit 30 and are transmitted or streamed to the memory 34. In this respect, additional information or metadata is/are determined at the same time, and indeed on the fly, i.e. directly on the transfer to the memory 34 and still while further image data of the image are to be read or are read by the Image sensor 24. The pre-processing steps that are relevant here relate to a first brightness adaptation and to a segmentation, i.e. the localizing of regions of interest with an optical code 20. Other pre-processing steps are conceivable. The image streamed to the memory 34 is preferably the original image in the sense that it was not changed by the first brightness adaptation. Other pre-processing steps remain conceivable, even if the term of original image is then no longer precisely correct. The image data changed by the first brightness adaptation are discarded once metadata have been acquired with them, in particular brightness information and the location of regions of interest, as still to be described in detail. Alternatively, the image is nevertheless streamed to the memory 34 after the first brightness adaptation as a supplement to an original image or instead of it.

The second processing unit 32 accesses the image data in the memory 34 to further process them. A decoder 36 of the second processing unit 32 here reads the content of the optical codes 20 recorded with the image data within regions of interest. The location of the regions of interest is communicated as metadata here. The second processing unit 32 preferably carries out a second brightness adaptation prior to the reading of the optical code 20. In contrast to the first brightness adaptation that preferably takes place for all the image data still without knowledge of regions of interest, the second brightness adaptation relates in each case directly to a region of interest. The second brightness adaptation can again utilize partial results of the first brightness adaptation that were stored as metadata.

Figure 3:
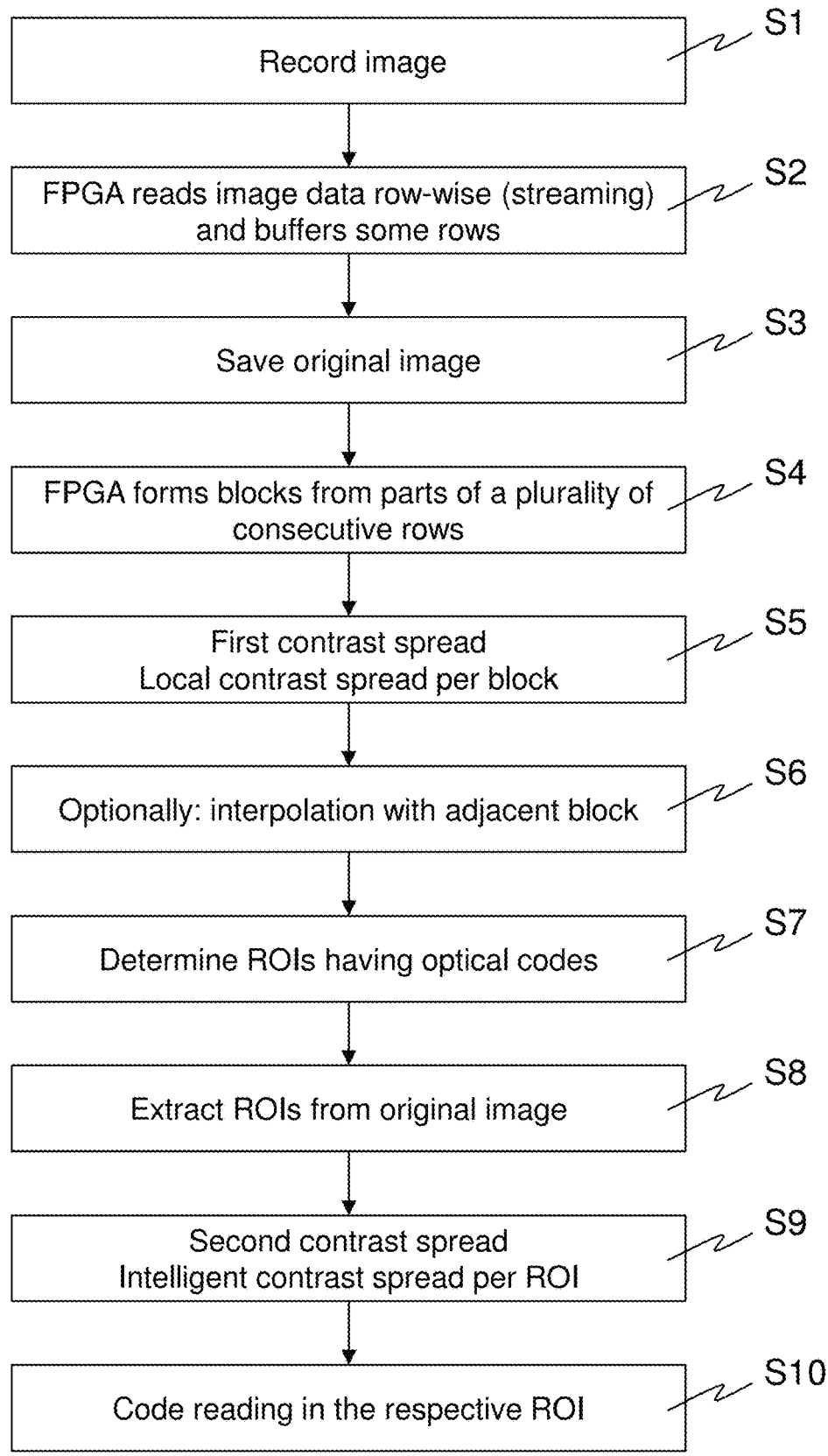
FIG. 3 an exemplary flowchart for reading an optical code.

FIG. 3 shows an exemplary flowchart for reading an optical code. In a step S1, an image is recorded by the image sensor 24. A separate preceding image recording step is an oversimplification since a row-wise recording preferably takes place in the course of a relative movement with ever further image recordings of the next image row step by step.

In a step S2, the image data are read piece by piece from the image sensor 24 by the first processing unit 30. For example, x pixels are transmitted row by row per cycle. The first pre-processing unit 30 buffers some image rows in a rolling manner, for example always the most recent five image rows.

In a step S3, the image data run through the first pre-processing unit 30 without any further processing steps and are written to the memory 34. This can be understood as a parallel streaming channel that saves the original image data. Pre-processing steps can optionally be carried out, for example image filters can be applied or the image can be binarized, but not the first brightness adaptation now to be described. It is conceivable to divide the original image into tiles, that is smaller, rectangular subsections of m×n pixels and to acquire respective brightness information for the second brightness adaptation in step S9, still to be explained, for this purpose. In the following sequence, use is instead preferably made in step S9 of brightness information that was acquired as part of the first brightness adaptation.

In a step S4, the first processing unit 30 forms blocks from the read image data in parallel with the direct storage of the image data of step S3, still during the streaming. For example, the rows are divided into regions having a specific number of pixels such as 128 or 256 pixels. A respective block is formed from the current row and the rows thereabove, for example a block of 5×128 pixels with five buffered rows.

Figure 4:
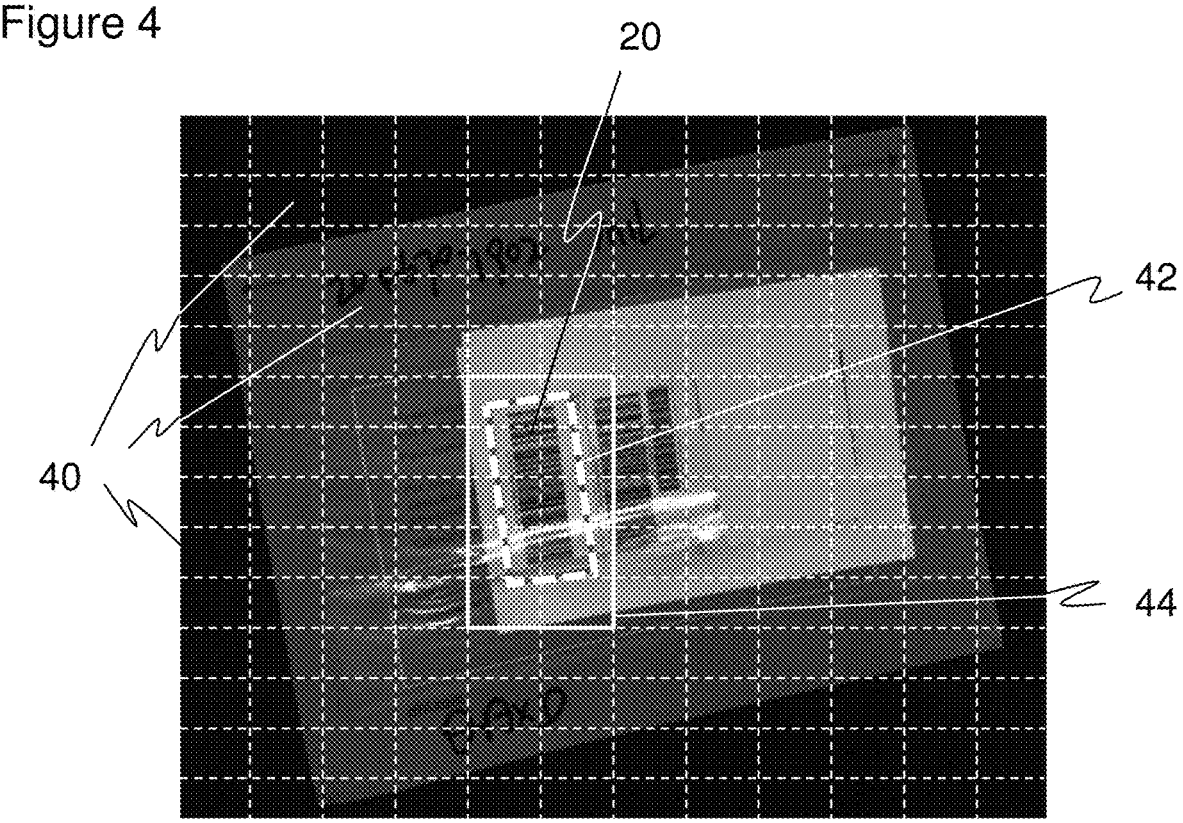
FIG. 4 an exemplary image having optical codes, a division into blocks, and a region of interest with an optical code.

FIG. 4 shows an example image having an optical code 20 and a division into blocks 40. This will be made use of multiple times in the following to illustrate the steps of FIG. 3. Alternatively to the shown division into a fixed grid, a respective pushing forward of blocks 40 by only one pixel in a rolling process similar to a moving average is also conceivable. This in particular applies in the vertical direction. It must further be noted that always only the already read image rows and blocks 40 are known during the process in accordance with FIG. 3. The streaming typically takes place from the top left to the bottom right so that, with an observed pixel, everything that follows further to the right and further to the bottom is not yet known. The process can so-to-say only look into the past, but not into the future. The present can as it were be pushed a little into the future by buffering and a corresponding time delay to the extent it is necessary to know a corresponding neighborhood of an observed pixel.

In a step S5 of FIG. 3, a first brightness adaptation takes place. This is described with reference to a contrast spread that spreads a range of occurring gray values over a wider range using a linear function or another function. To determine the range, a gray scale histogram is formed for a respective block of, for example, 5×128 pixels and two peaks are looked for therein that correspond to the light and dark values of the code 20 and between which the range is disposed. In a simple evaluation, only the minimal and maximum gray values in the block are looked for. The actual range [MinGray, MaxGray] is then spread over the available gray scale range of, for example, [0, 255] with an 8 bit gray scale resolution or over a range artificially selected as a little smaller [9, 255−j], where i, j are small natural numbers.

The contrast spread for a respective pixel in (x,y) can be given as a formula as follows: $im_{cp}(x,y)=(im(x,y)-MinGray)/(MaxGray-MinGray)$, where MinGray and MaxGray were determined in the block of the pixel in (x,y). It is consequently a local contrast spread into which (only) the information of the associated block enters.

In an optional step S6, the contrast spread is related to a somewhat larger image region. Strictly speaking, step S6 is not an additional step, but the calculation rule given at step S5 is replaced with:

$$im_{cp}(x, y) = p(im(x, y) - MinGray_i)/(MaxGray_i - MinGray_i) +$$
$$(1 - p)(im(x, y) - MinGray_{i+1})/(MaxGray_{i+1} - MinGray_{i+1}).$$

The indices i, i+1 relate to the block of the observed pixel in (x,y) and to its adjacent block. p is furthermore a weighting factor between the two blocks. Interpolation rules are conceivable that consider even more blocks.

To make the calculation rule and the weighting factor p clearer with an example, let a pixel be observed at the row position x=190. With a block length of 128, this pixel is associated with the second block. The weighting factor p in this exemplary embodiment should take account of how near or far the observed pixel is to or from its adjacent block, measured at the center of a block. Half the block size is 64 and is (190−64)12/8=0.98. 98% of the actual block and only 2% of the preceding adjacent block should therefore be taken into account, that is the first block.

In general terms, P1=(x−w/2) w, with the row coordinate x and the block width w, P1 can be greater than one, it is then reduced to one. Then p=1−P1 so that the above example values of 2% for the first block and 98% for the second block are reconstructed.

Figure 5:
FIG. 5 an exemplary recorded image that is too dark with an optical code.
Figure 6:
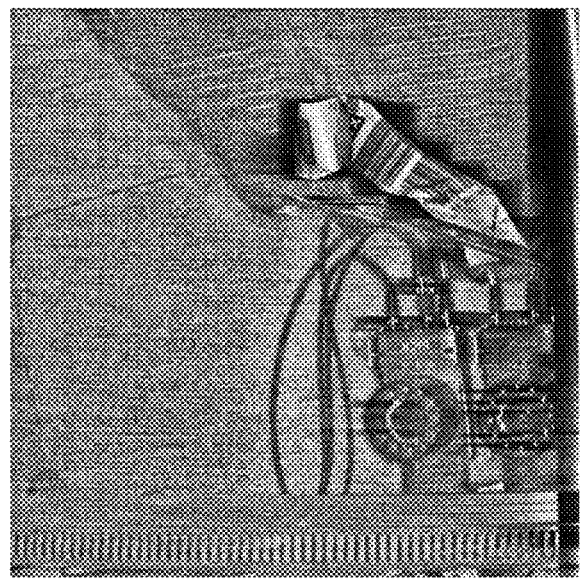
FIG. 6 the image in accordance with FIG. 5 after a first brightness adaptation.

FIGS. 5 and 6 illustrate this first brightness adaptation. FIG. 5 in this respect shows an exemplary image that is recorded as too dark and that has an optical code in the original and FIG. 6 after the first brightness adaptation. Details obviously become clear after the first brightness adaptation that were previously not able to be recognized.

In a step S7, regions of interest having optical codes 20 are located in the image prepared by the first brightness adaptation. This corresponds to the segmentation that was discussed in the introduction and that is known per se. Thanks to the first brightness adaptation, a segmentation is now also possible with a dark image such as that of FIG. 5.

FIG. 4 shows a region of interest 42 by way of example. There would be even more optical codes and regions of interest there that are processed in the same way, but are not looked at in any more detail here for reasons of simplicity. The decision whether an image region belongs to a region of interest 42 is based on local criteria so that the segmentation preferably takes place on the fly in the first processing unit 30.

A process of machine learning, in particular a (deep) neural network or a convolutional neural network (CNN) is preferably used for the segmentation. A process of machine learning copes with the artefacts that occur at times due to the first brightness adaptation in a much more tolerant manner and still provides robust segmentation. As EP 3 916 633 A1, that is already named in the introduction and to which reference is additionally made, shows, a segmentation is also possible on the fly with a neural network on the first processing unit 30.

The neural network can be trained in advance using example images with known code image regions (supervised learning). Such example images can be evaluated by hand (labeling, annotating). On the other hand, it is possible to evaluate example images using a classical decoder and to retrospectively recognize regions of interest using actually readable codes. Such classical means are very powerful particularly without time pressure in the offline mode so that a plurality of training examples can be automatically generated.

In a step S8, the regions of interest in the original image that were stored in step S3 are determined. The regions of interest can namely indeed be localized very easily in the image prepared by the first brightness adaptation, as shown by way of example in FIG. 6; only the optical code 20 is frequently no longer legible in an image that is contrast-spread row-wise. The image is therefore preferably only used for the localization of the regions of interest after the first brightness adaptation and is then discarded. The second processing unit 32 then uses the positions of the regions of interest available as metadata to directly further process only image regions with optical codes 20 in the original image.

In a step S9, an optional second brightness adaptation takes place. The original image, as shown by way of example in FIG. 5, can be too dark for code reading. The second brightness adaptation takes place in a very targeted manner for the region of interest. This does not only mean that image regions outside regions of interest can be ignored; the range of the spread brightness values above all fits precisely over the regions of interest and therefore highlights the optical code 20 very well.

In principle, the second brightness adaptation runs like the first brightness adaptation, i.e. a range of occurring brightness values is in particular determined using minimal and maximum values or histograms and is spread over a larger range of possible brightness values using a preferably linear spread function. The occurring brightness values are, however, now not those of blocks 40 that were formed independently of image content, but rather those from the region of interest.

Partial results of the first brightness adaptation can be used again here to avoid double evaluations if such partial results are also stored as metadata. Alternatively, tiles are formed independently of the first brightness adaptation, whether blocks of the same dimensions as in the first brightness adaptation or other tiles, and corresponding metadata thereof are generated and stored. A particularly preferable procedure will be explained again with reference to FIG. 4. The location of the region of interest 52 is now known from step S7. A selection 44 of blocks 40 that covers the region of interest 42 is selected. How blocks in a marginal location are treated must still be decided here. In the example of FIG. 4, the selection 44 comprises all the blocks 40 that somehow overlap with the region of interest. It is alternatively conceivable to at least partially exclude blocks 40 at the margin. For this purpose, a minimum portion, for instance a percentage threshold value p %, of the overlap can be required and only blocks 40 having at least this overlap are included in the selection 44. For example with a threshold value of 50%, the two lower blocks 40 and possibly even more blocks 40 would be removed from the selection 44. The representation corresponds to a small threshold value of below 10%.

The minimal and maximum brightness values or histograms for the blocks 40 of the selection 44 are already present as metadata. Minimal and maximum brightness values of the region of interest 42 can now be determined therefrom with very few comparisons. Or the histograms of the blocks 40 of the selection 44 are combined in that the counts per bin are added to thus effectively obtain a histogram for the region of interest 42. The combination has less computing effort; access to individual pixels is no longer required for this.

In a step S10, the optical codes 20 in the region of interest 42 are read. Suitable decoders are known per se and will not be explained in more detail. The code reading only takes place on a small portion of the images namely within the region of interest 42 in which an optical code 20 is actually present in accordance with the segmentation of step S7. In addition, an adapted second brightness adaptation that further supports successful code reading has preferably taken place in step S9.

Figure 7:
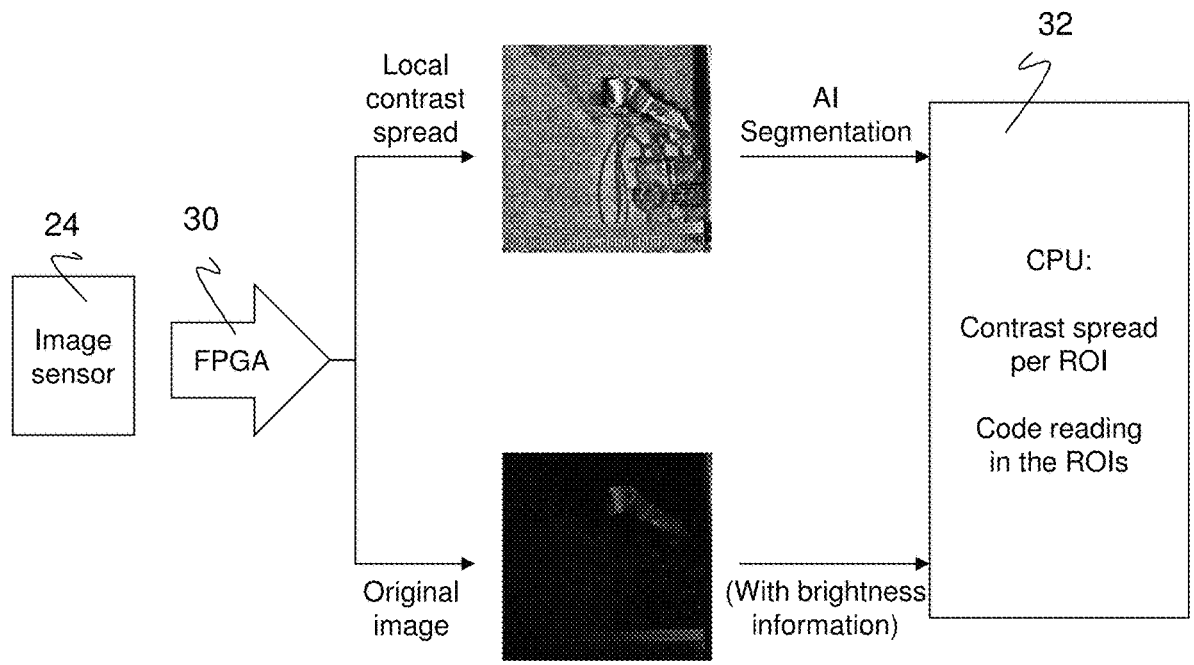
FIG. 7 an alternative schematic representation of a routine for reading an optical code.

FIG. 7 finally shows an alternative schematic representation of a routine for reading an optical code 20. Corresponding to steps S1 to S3, the first processing unit 30 in a lower path of FIG. 7 streams the image data as an original image to the memory 34. In this respect, tile-wise brightness evaluations can be carried out on the fly during streaming and can be stored as metadata. The corresponding brightness information is in parentheses since this is an optional step in multiple regards. On the one hand, the brightness information can also be determined and can be transferred as metadata in the upper path or only calculated in the CPU 32. In addition, a second brightness adaptation in accordance with step S9 has already been described as optional per se.

In an upper path of FIG. 7, the image is processed on the fly by the first processing unit 30 using a first brightness adaptation corresponding to steps S4 to S6 and subsequently, in accordance with step S7, the regions of interest are preferably localized using a process of machine learning.

The second processing unit 32 makes use of the metadata having the positions of regions of interest from the upper path and, in accordance with step S8, processes the associated image content of the original image from the lower image directly only in the regions of interest. After an optional second brightness adaptation corresponding to step S9, the optical codes 20 in the regions of interest are read in a manner corresponding to step S10.

The invention claimed is:

1. A method of reading an optical code in which an image having the code is recorded, comprising:
    carrying out a first brightness adaptation of the image;
    identifying a region of interest having the optical code located in the image;
    subsequent to identifying the optical code in the region of image, performing a second brightness adaptation; and
    subsequent to performing the second brightness adaptation, reading the optical code in the region of interest,
    wherein the first brightness adaptation is a local brightness adaptation that is carried out in partial regions of the image still while further sections of the image are read; and wherein the localization of the region of interest is based on image information of the image already processed by the first brightness adaptation,
    wherein the image having the code is stored as the original image without the first brightness adaptation,
    and wherein the code in a region of interest is read with information of the image without the first brightness adaptation.

2. The method in accordance with claim 1, wherein the first brightness adaptation is a contrast spread that spreads a range of the brightness values occurring in a respective partial region over a larger range.

3. The method in accordance with claim 1, wherein the range of the brightness values occurring in a partial region is determined from at least one smallest and one largest occurring brightness value.

4. The method in accordance with claim 1, wherein the spread of the brightness values occurring in a partial region is determined from two peaks in a local histogram of the brightness values over the partial region.

5. The method in accordance with claim 1, wherein the image is read row-wise; and wherein a plurality of rows are buffered to form partial regions therefrom.

6. The method in accordance with claim 5, wherein the partial region is a block of a plurality of partial sections of a plurality of consecutive rows.

7. The method in accordance with claim 6, wherein brightness values of at least one adjacent block are included in the first brightness adaptation.

8. The method in accordance with claim 1, wherein the region of interest is localized in a segmentation process using machine learning.

9. The method in accordance with claim 8, wherein the segmentation process is a neural network.

10. The method in accordance with claim 1, wherein the second brightness adaptation is carried out for the region of interest prior to the reading of the code.

11. The method in accordance with claim 1, wherein pre-processing steps of the first brightness adaptation are used for the second brightness adaptation.

12. The method in accordance with claim 11, wherein the pre-processing steps of the first brightness adaptation that are used for the second brightness adaptation comprise smallest and largest brightness values occurring in respective partial regions and/or local histograms of brightness values occurring in a respective partial region.

13. The method in accordance with claim 1, wherein a first processing unit reads the image in the sections, carries out the first brightness adaptation of the image, and localizes the region of interest in the image.

14. The method in accordance with claim 1, wherein the first processing unit is an FPGA.

15. The method in accordance with claim 1, wherein a second processing unit reads the optical code in the region of interest.

16. The method in accordance with claim 15, wherein the second processing unit is a microprocessor.

17. The method in accordance with claim 15, wherein the second processing unit carries out a second brightness adaptation for the region of interest beforehand.

18. An optoelectronic code reader having at least one light reception element for generating image data from received light and having a control and evaluation unit in which a method of reading optical codes is implemented, comprising:
- a circuit element for recording an image having an optical code;
- a first circuit function for carrying out a first brightness adaptation of the image;
- a second circuit function for identifying a region of interest having the optical code located in the image;
- a third circuit function for performing a second brightness adaptation in the region of interest subsequent to performing the first brightness adaptation,
- wherein the image having the code is stored as the original image without the first brightness adaptation,
- wherein the code in a region of interest is read with information of the image without the first brightness adaptation,
- and wherein the first brightness adaptation is a local brightness adaptation that is carried out in partial regions of the image still while further sections of the image are read; and wherein the localization of the region of interest is based on image information of the image already processed by the first brightness adaptation.

* * * * *